Nov. 3, 1925.
B. S. MAHAFFEY
1,560,296
SEDIMENT PLUG AND VALVE
Filed July 10, 1922
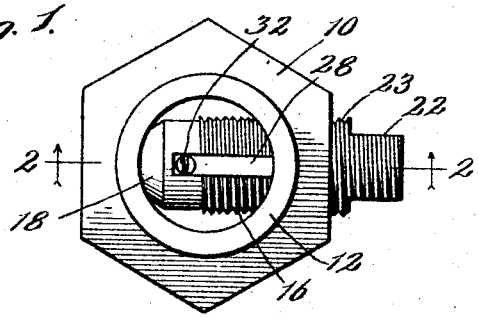
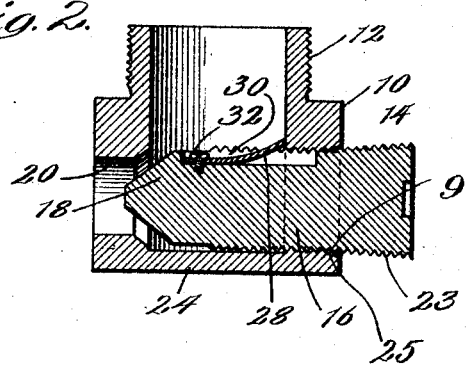
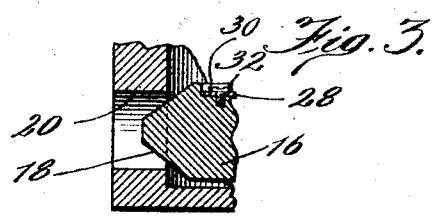
Inventor:
Benjamin S. Mahaffey
By Mason, Fenwick & Lawrence
Attys.

Patented Nov. 3, 1925.

1,560,296

UNITED STATES PATENT OFFICE.

BENJAMIN S. MAHAFFEY, OF CHICAGO, ILLINOIS.

SEDIMENT PLUG AND VALVE.

Application filed July 10, 1922. Serial No. 573,853.

*To all whom it may concern:*

Be it known that I, BENJAMIN S. MAHAFFEY, a citizen of the United States, residing at Chicago, in the county of Cook and State of Illinois, have invented certain new and useful Improvements in Sediment Plugs and Valves; and I do hereby declare the following to be a full, clear, and exact description of the invention, such as will enable others skilled in the art to which it appertains to make and use the same.

This invention relates to improvements in combined sediment plugs and valves, especially for automobile crank cases or the like, and has for one of its principal objects the provision of a plug which will close the drain opening commonly provided on automobile crank pans or crank cases, and which will at the same time operate as a continuously acting, sediment collecting means and provided with a discharging device which can be operated when desired.

One of the important objects of this invention is the provision of a combined drain plug and sediment valve for automobiles which can be operated to drain the sediment which collects in the oil in the crank case, without necessitating the removal of the original plug which is always accompanied by expenditure of considerable trouble and inconvenience experienced in crawling under the machine.

A further important object of this invention is the provision of a combined sediment plug and valve for use with the crank cases of automobiles which will automatically act to collect, by gravity, any sediment occurring in the oil of the crank case and which in operation will promptly and thoroughly drain all such sediment which has been collected during the use of the machine for the period prior to the opening of the valve.

Still another important object of this invention is the provision of a combined sediment plug and valve for automobile crank pans or the like which can be operated from the side of the motor without the inconvenience of getting under the machine which is ordinarily necessary in the removal of such drain plugs and the changing of the oil in the crank case of the automobile.

Other and further important objects of the invention will be apparent from the disclosures in the accompanying drawings and following specification.

The invention, in a preferred form, is illustrated in the drawings and hereinafter more fully described.

In the drawings:

Fig. 1 is a top plan view of the improved sediment plug and valve of this invention;

Fig. 2 is a sectional view taken on line 2—2 of Fig. 1;

Fig. 3 shows a slight modification.

As shown in the drawings, the reference numeral 10 indicates the body of the plug which is preferably hexagonal in shape but which, if desired, may be made of any other convenient shape. As shown in the figures, the plug is hollow and this provides a chamber for the collection of the sediment which is ordinarily distributed over the entire bottom of the usual automobile crank case. An upwardly extending nipple 12, provided with screw threads, is integral with the body 10, and the height of this nipple 12 is approximately the thickness of the ordinary automobile crank pan so that the edges thereof will be flush with the bottom of the pan when the plug is mounted in position, thereby providing for a ready drainage of all sediment into the plug chamber. The plug may be composed of any suitable material, as iron or the like.

Mounted in an opening 9 in the lower portion of the plug by means of screw threads 14 is a valve member 16 which extends therethrough and is parallel and in close proximity to the bottom 24 of the plug 10. The inner end 18 of this valve member 16 is tapered, as shown in the drawings, and is adapted to cooperate with a circular opening 20 drilled or otherwise provided in the side of the plug 10. The inner face of the circular opening 20 is tapered to correspond with the tapered end 18 in order that a very close fit may be attained between the valve member 16 and the opening 20 so that there will be no possibility of leakage.

The tapered faces may be reground, if desired or necessary. In order to effectively prevent the collection of any sediment or other foreign matter between the face of the valve and the opening 20 the edges of the opening may be made sharp, as shown in Fig. 3.

The outwardly extending end of the valve member 16 is flattened as shown at 22 in order to provide for the ready application of a wrench or the like thereto. Further, there is provided in this outwardly extending end 22 a slot in which there may be inserted the edge of a screw driver. As shown at 23, the outer edge of the member 16 is enlarged in frustro-conical form with screw threads thereon to cooperate with corresponding tapered face 25 in the opening 9 thereby furnishing a locking means to retain the member 16 in closed position. The circular openings 9 and 20 are located as near as possible to the bottom 24 of the plug 10 so that there will be no possibility of any sediment collecting on the bottom of the plug and thereby insuring that the entire interior of the plug will be effectively drained when the valve 16 is opened. This is further effected on account of the increased head of liquid and consequent increased pressure due to the depth of the plug 10.

A spring 28 or other retaining means is provided in a suitable groove 30 slotted into the face of the valve member 16. This prevents the accidental removal of the valve 16 from the plug 10. The spring 28 is fixed in position by a machine screw 32 or the like. It is evident that any suitable stop may be used, as a cotter pin or the like.

It will be evident that herein is provided a simple device which may be attached to any automobile crank case or crank pan now on the market in place of the ordinary plug usually used and which, whenever it is desired to drain the oil, or perhaps merely flush out the sediment which has collected during a run of possibly on or two thousand miles, may be opened conveniently and the sediment drained therefrom. This opening of the valve may be accomplished by means of an ordinary long handled wrench such as is provided with Ford cars in order to determine the level of the oil in the crank case; or the provision of the slot in the end of the valve member 16 will enable an ordinary screw driver to be used in connection therewith, thereby obviating the necessity of getting under the automobile and the crank case thereof in order to drain the oil. By means of this attachment all the sediment collecting in the oil which is usually distributed over the entire bottom of the crank case and from there is necessarily stirred up into the oil and into the bearings, is hereby positively collected in the plug and the oil is kept free from sediment or pieces of metal which act to damage the motor to quite a considerable extent if they become lodged on bearing surfaces or the like.

I am aware that many changes may be made and numerous details of construction varied throughout a wide range without departing from the principles of this invention and I therefore do not purpose limiting the patent granted hereon otherwise than as necessitated by the prior art.

I claim as my invention:

1. A combined sediment plug and valve comprising a plug casing having a sediment collecting chamber therein, opposite sides of the plug casing having openings therein, one of said openings having a seat and the other opening having a thread, a threaded valve member in the latter opening and having one end adapted to engage the seat and the other end adapted for application of a tool for turning the same, the top of the valve member having a groove therein, and a spring fixed in the groove and adapted at its outer end to engage an inner face of the plug to prevent accidental removal of the valve member.

2. A combined sediment plug and valve for automobile crank cases including a hollow sediment plug, means at the top thereof adapted to its attachment to an automobile crank case and drainage means substantially flush with the bottom of the sediment chamber comprising two circular openings diametrically opposite each other one of said openings being provided with screw threads and the other of said openings having a ground seat, a valve member screw-threadedly mounted in one of said openings and adapted to cooperate with the ground seat of the other opening and a spring on the valve member to engage the inner face of the plug to prevent displacement of the valve member.

3. A combined sediment plug and valve comprising a plug casing having a sediment collecting chamber therein, opposite sides of the plug casing having openings therein, a valve member adjustable in one opening and adapted to engage the seat at the inner end of the other opening, said valve member having a longitudinal peripheral groove therein, and means seated in the groove, and secured by one end and adapted to engage the inner face of the plug to prevent accidental removal of the valve member.

4. A combined sediment plug and valve comprising a plug casing having a sediment collecting chamber therein and an externally threaded connection extension for attachment to an automobile crank case opposite sides of the plug casing having openings therein substantially flush with the bottom of the casing chamber, one of said openings having a seat and the other said opening having a tapered thread, a tapered threaded valve member in the latter opening and having one end adapted to engage the seat and the other end adapted for application of a tool for turning the same, the top of the valve member having a groove therein, and a spring fixed in the groove and adapted at its outer end to engage the inner face of the plug to prevent accidental removal of the valve member.

In testimony whereof I affix my signature.

BENJAMIN S. MAHAFFEY.